US012657454B2

(12) United States Patent
Yang et al.

(10) Patent No.: US 12,657,454 B2
(45) Date of Patent: Jun. 16, 2026

(54) SYSTEMS AND METHODS FOR UNSUPERVISED ANOMALY DETECTION

(71) Applicant: Salesforce, Inc., San Francisco, CA (US)

(72) Inventors: Wenzhuo Yang, Singapore (SG); Chu Hong Hoi, Singapore (SG); Kun Zhang, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 907 days.

(21) Appl. No.: 17/589,595

(22) Filed: Jan. 31, 2022

(65) Prior Publication Data

US 2023/0244925 A1     Aug. 3, 2023

(51) Int. Cl.
| | |
|---|---|
| *G06N 3/08* | (2023.01) |
| *G06F 18/21* | (2023.01) |
| *G06F 18/2433* | (2023.01) |

(52) U.S. Cl.
CPC ............. *G06N 3/08* (2013.01); *G06F 18/217* (2023.01); *G06F 18/2433* (2023.01)

(58) Field of Classification Search
CPC ...... G06N 3/08; G06F 18/217; G06F 18/2433
See application file for complete search history.

(56) References Cited

U.S. PATENT DOCUMENTS

| | | | | |
|---|---|---|---|---|
| 11,811,588 | B2 * | 11/2023 | Ford | ...................... H04L 41/069 |
| 2022/0303288 | A1 * | 9/2022 | Wang | .................. G06F 18/2113 |

FOREIGN PATENT DOCUMENTS

| | | | | |
|---|---|---|---|---|
| CN | 113011490 A | * | 6/2021 | ......... G06F 18/2415 |

* cited by examiner

*Primary Examiner* — Li B. Zhen
*Assistant Examiner* — Griffin Tanner Bean
(74) *Attorney, Agent, or Firm* — Haynes and Boone, LLP

(57) ABSTRACT

Embodiments described herein provide a system and method for unsupervised anomaly detection. The system receives, via a communication interface, a dataset of instances that include anomalies. The system determines, via an inlier model, a set of noisy labels. The system trains a causality-based label-noise model based at least in part on the set of noisy labels and the set of high-confidence instances. The system determines an estimated proportion of anomalies in the dataset of instances. The system retrains the inlier model based on the estimated inlier samples. The system iteratively retrains the inlier model and the trained causality-based label-noise model based on the output from the corresponding retrained models not converging within the convergence threshold. The system extracts the anomaly detection model from the iteratively trained causality-based label-noise model.

20 Claims, 12 Drawing Sheets

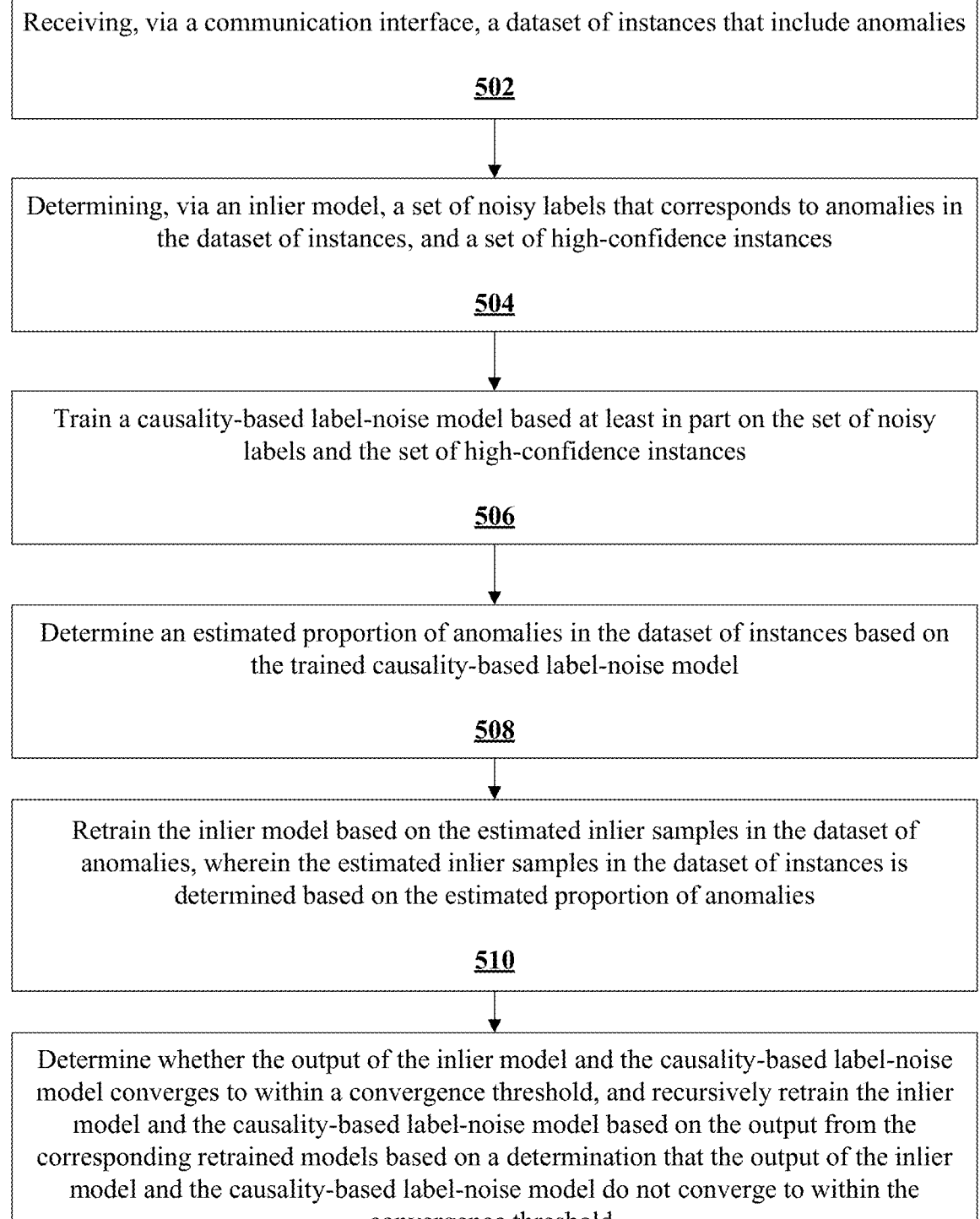

Receiving, via a communication interface, a dataset of instances that include anomalies

502

Determining, via an inlier model, a set of noisy labels that corresponds to anomalies in the dataset of instances, and a set of high-confidence instances

504

Train a causality-based label-noise model based at least in part on the set of noisy labels and the set of high-confidence instances

506

Determine an estimated proportion of anomalies in the dataset of instances based on the trained causality-based label-noise model

508

Retrain the inlier model based on the estimated inlier samples in the dataset of anomalies, wherein the estimated inlier samples in the dataset of instances is determined based on the estimated proportion of anomalies

510

Determine whether the output of the inlier model and the causality-based label-noise model converges to within a convergence threshold, and recursively retrain the inlier model and the causality-based label-noise model based on the output from the corresponding retrained models based on a determination that the output of the inlier model and the causality-based label-noise model do not converge to within the convergence threshold.

Receive a dataset that includes anomalies

602

Determining, via an inlier model, a set of noisy labels that identify anomalies in the dataset based on a contamination parameter

604

Determine a set of high-confidence samples based on the inlier model

606

Train a second anomaly detection model based on the set of noisy labels that identifies a set of anomalies in the dataset of instances

608

Determine an intermediate probability of anomalies in the dataset based on the second model

610

Determine whether the set of noisy labels based on the inlier model and the intermediate clean labels set based on the second model is within a convergence threshold

612

Iteratively retraining the inlier model based on the set of intermediate clean labels, and retraining the second model based on noisy labels and high confidence samples obtained from the inlier model in a feedback loop linked to the determination of whether the nosily labels and the set of intermediate clean labels are within the convergence threshold

614

Determine a refined contamination parameter associated with the second model based on the probability of anomalies in the second model at convergence.

Table 1: The AUC scores of anomaly detection performance on the simulation datasets.

| Dataset | OCSVM | COPOD | LOF | LODA | KNN | HBOS | IForest | AE | VAE | LabelProp | Ours |
|---|---|---|---|---|---|---|---|---|---|---|---|
| Case 1 | 0.983 | 0.997 | 0.536 | 0.886 | 0.941 | 0.986 | 0.968 | 0.699 | 0.983 | 0.680 | 0.999 |
| Case 2 | 1.000 | 0.972 | 0.948 | 0.997 | 0.995 | 0.989 | 1.000 | 0.985 | 1.000 | 1.000 | 1.000 |
| Case 3 | 0.983 | 0.955 | 0.976 | 0.973 | 0.993 | 0.977 | 0.982 | 0.983 | 0.982 | 0.972 | 0.995 |
| Case 4 | 0.981 | 0.981 | 0.686 | 0.949 | 0.976 | 0.961 | 0.976 | 0.959 | 0.961 | 0.979 | 0.985 |

FIG. 10

| Dataset | OCSVM | COPOD | LOF | LODA | KNN | HBOS | IForest | AE | VAE | LabelProp | Ours |
|---|---|---|---|---|---|---|---|---|---|---|---|
| Case 1 | 0.653 | 0.667 | 0.128 | 0.653 | 0.580 | 0.616 | 0.507 | 0.280 | 0.667 | 0.510 | 0.940 |
| Case 2 | 0.667 | 0.653 | 0.240 | 0.658 | 0.683 | 0.635 | 0.667 | 0.667 | 0.667 | 0.667 | 1.000 |
| Case 3 | 0.667 | 0.667 | 0.640 | 0.667 | 0.667 | 0.667 | 0.667 | 0.667 | 0.667 | 0.830 | 0.788 |
| Case 4 | 0.667 | 0.667 | 0.227 | 0.667 | 0.667 | 0.658 | 0.667 | 0.667 | 0.667 | 0.876 | 0.907 |

FIG. 11

| Dataset | OCSVM | COPOD | LOF | LODA | KNN | HBOS | IForest | AE | VAE | Ours |
|---|---|---|---|---|---|---|---|---|---|---|
| Glass | 0.441 | 0.788 | 0.811 | 0.600 | 0.864 | 0.802 | 0.510 | 0.525 | 0.672 | 0.292 ±0.086 |
| Heart Disease | 0.605 | 0.814 | 0.559 | 0.557 | 0.673 | 0.859 | 0.757 | 0.869 | 0.774 | 0.861 ±0.013 |
| Ionosphere | 0.739 | 0.789 | 0.861 | 0.808 | 0.926 | 0.842 | 0.855 | 0.751 | 0.785 | 0.864 ±0.009 |
| PIMA | 0.698 | 0.680 | 0.668 | 0.662 | 0.790 | 0.685 | 0.722 | 0.743 | 0.711 | 0.686 ±0.017 |
| Shuttle | 0.579 | 0.811 | 0.598 | 0.544 | 0.785 | 0.641 | 0.850 | 0.446 | 0.560 | 0.705 ±0.006 |
| Stamps | 0.818 | 0.838 | 0.727 | 0.912 | 0.836 | 0.884 | 0.892 | 0.871 | 0.935 | 0.511 ±0.008 |
| Waveform | 0.559 | 0.754 | 0.715 | 0.844 | 0.746 | 0.683 | 0.690 | 0.774 | 0.638 | 0.802 ±0.021 |
| WBC | 0.997 | 0.665 | 0.841 | 0.997 | 0.992 | 0.989 | 0.994 | 0.997 | 0.993 | 0.997 ±0.000 |
| Wilt | 0.240 | 0.345 | 0.539 | 0.491 | 0.492 | 0.346 | 0.439 | 0.304 | 0.331 | 0.386 ±0.003 |
| WPBC | 0.474 | 0.525 | 0.518 | 0.513 | 0.531 | 0.535 | 0.482 | 0.493 | 0.478 | 0.505 ±0.018 |
| Average | 0.615 | 0.740 | 0.684 | 0.674 | 0.757 | 0.707 | 0.740 | 0.671 | 0.667 | 0.767 |

FIG. 12

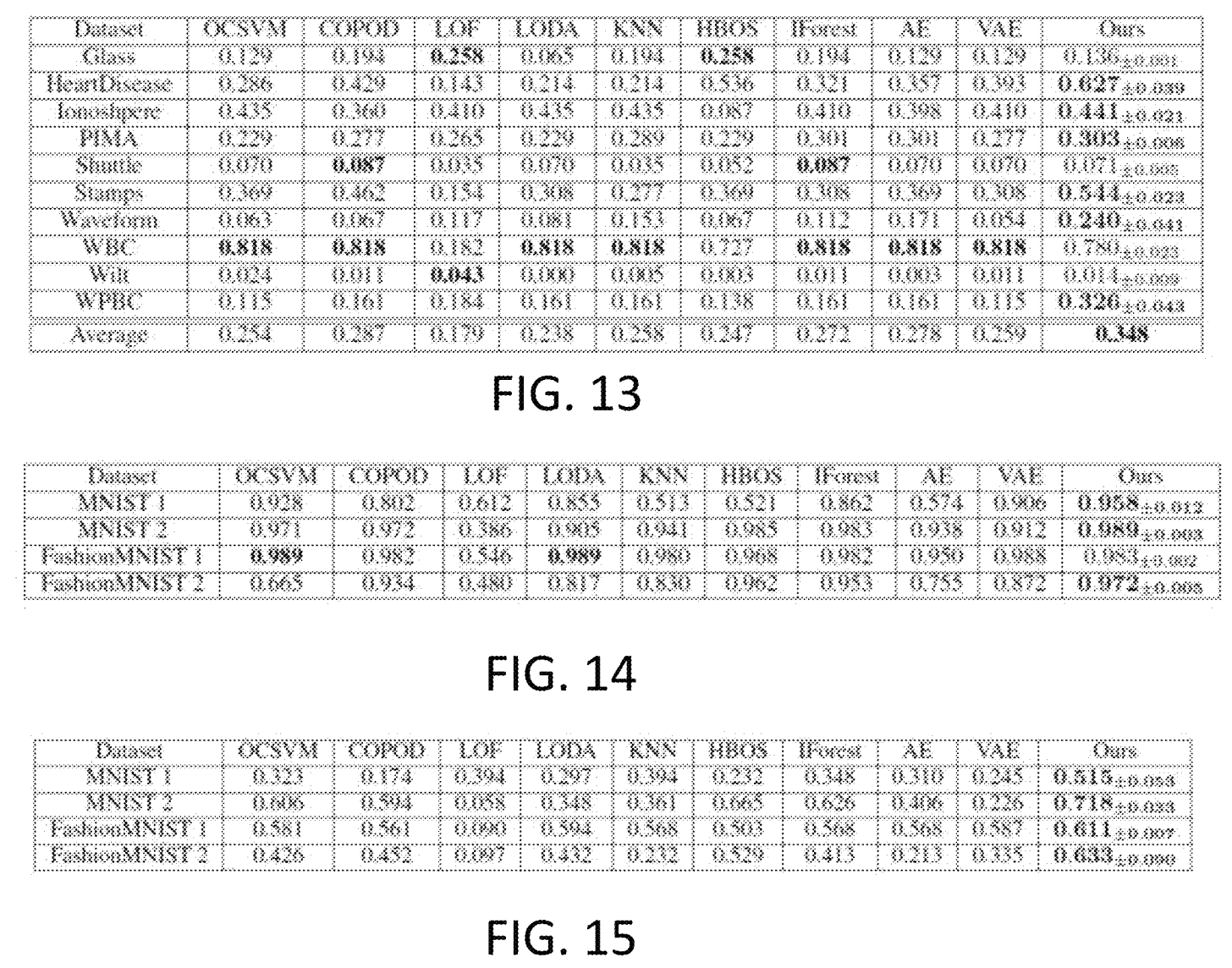

| Dataset | OCSVM | COPOD | LOF | LODA | KNN | HBOS | IForest | AE | VAE | Ours |
|---|---|---|---|---|---|---|---|---|---|---|
| Glass | 0.129 | 0.194 | 0.258 | 0.065 | 0.104 | 0.258 | 0.194 | 0.129 | 0.129 | 0.196 ± 0.001 |
| HeartDisease | 0.386 | 0.429 | 0.143 | 0.214 | 0.214 | 0.536 | 0.321 | 0.357 | 0.393 | 0.627 ± 0.088 |
| Ionosphere | 0.435 | 0.360 | 0.410 | 0.435 | 0.435 | 0.087 | 0.410 | 0.308 | 0.410 | 0.441 ± 0.021 |
| PIMA | 0.229 | 0.277 | 0.265 | 0.229 | 0.289 | 0.229 | 0.301 | 0.301 | 0.277 | 0.303 ± 0.008 |
| Shuttle | 0.070 | 0.087 | 0.035 | 0.076 | 0.035 | 0.052 | 0.087 | 0.070 | 0.070 | 0.071 ± 0.003 |
| Stamps | 0.369 | 0.442 | 0.154 | 0.308 | 0.277 | 0.369 | 0.308 | 0.389 | 0.308 | 0.544 ± 0.023 |
| Waveform | 0.063 | 0.067 | 0.117 | 0.081 | 0.153 | 0.067 | 0.112 | 0.171 | 0.054 | 0.240 ± 0.041 |
| WBC | 0.818 | 0.818 | 0.182 | 0.818 | 0.818 | 0.727 | 0.818 | 0.818 | 0.818 | 0.780 ± 0.008 |
| Wilt | 0.004 | 0.011 | 0.043 | 0.000 | 0.005 | 0.003 | 0.011 | 0.003 | 0.011 | 0.011 ± 0.004 |
| WPBC | 0.115 | 0.161 | 0.184 | 0.161 | 0.161 | 0.138 | 0.161 | 0.161 | 0.115 | 0.320 ± 0.044 |
| Average | 0.254 | 0.287 | 0.179 | 0.238 | 0.238 | 0.247 | 0.272 | 0.278 | 0.259 | 0.345 |

FIG. 13

| Dataset | OCSVM | COPOD | LOF | LODA | KNN | HBOS | IForest | AE | VAE | Ours |
|---|---|---|---|---|---|---|---|---|---|---|
| MNIST 1 | 0.928 | 0.802 | 0.612 | 0.855 | 0.573 | 0.521 | 0.862 | 0.574 | 0.986 | 0.958 ± 0.012 |
| MNIST 2 | 0.971 | 0.972 | 0.386 | 0.885 | 0.941 | 0.085 | 0.085 | 0.936 | 0.912 | 0.980 ± 0.008 |
| FashionMNIST 1 | 0.989 | 0.982 | 0.546 | 0.989 | 0.980 | 0.968 | 0.982 | 0.980 | 0.988 | 0.984 ± 0.002 |
| FashionMNIST 2 | 0.065 | 0.934 | 0.480 | 0.917 | 0.880 | 0.962 | 0.953 | 0.755 | 0.872 | 0.972 ± 0.008 |

FIG. 14

| Dataset | OCSVM | COPOD | LOF | LODA | KNN | HBOS | IForest | AE | VAE | Ours |
|---|---|---|---|---|---|---|---|---|---|---|
| MNIST 1 | 0.323 | 0.174 | 0.394 | 0.297 | 0.394 | 0.232 | 0.348 | 0.310 | 0.295 | 0.515 ± 0.008 |
| MNIST 2 | 0.806 | 0.394 | 0.088 | 0.348 | 0.381 | 0.885 | 0.655 | 0.406 | 0.235 | 0.718 ± 0.008 |
| FashionMNIST 1 | 0.581 | 0.561 | 0.060 | 0.594 | 0.568 | 0.503 | 0.566 | 0.564 | 0.587 | 0.611 ± 0.007 |
| FashionMNIST 2 | 0.426 | 0.452 | 0.097 | 0.432 | 0.232 | 0.529 | 0.413 | 0.213 | 0.335 | 0.633 ± 0.009 |

FIG. 15

Figure 7: Glass dataset (Red points are anomalies). (a)
Ground truth. (b) Results by AE. (c) Results by Ours.

SYSTEMS AND METHODS FOR UNSUPERVISED ANOMALY DETECTION

TECHNICAL FIELD

The embodiments relate generally to machine learning systems and their hardware implementations, and more specifically to systems and methods for unsupervised anomaly detection.

BACKGROUND

Anomaly detection plays an important role in real-world applications, e.g., credit card fraud detection, manufacturing industry, and cyber security. Anomalies or outliers are those data points that deviate from regular distributions or behaviors. Datamining and machine learning are used to identify anomalies.

BRIEF DESCRIPTION OF THE DRAWINGS

FIGS. 5 and 6 are simplified logic flow diagrams illustrating an example process of training an anomaly detection model using the framework shown in FIGS. 1 and 3, according to embodiments described herein.

FIGS. 7-18 provide various data tables and plots illustrating example performance of the anomaly detection model and the anomaly detection using the trained model and/or method described in FIGS. 1-6, according to one embodiment described herein.

Figure 1:
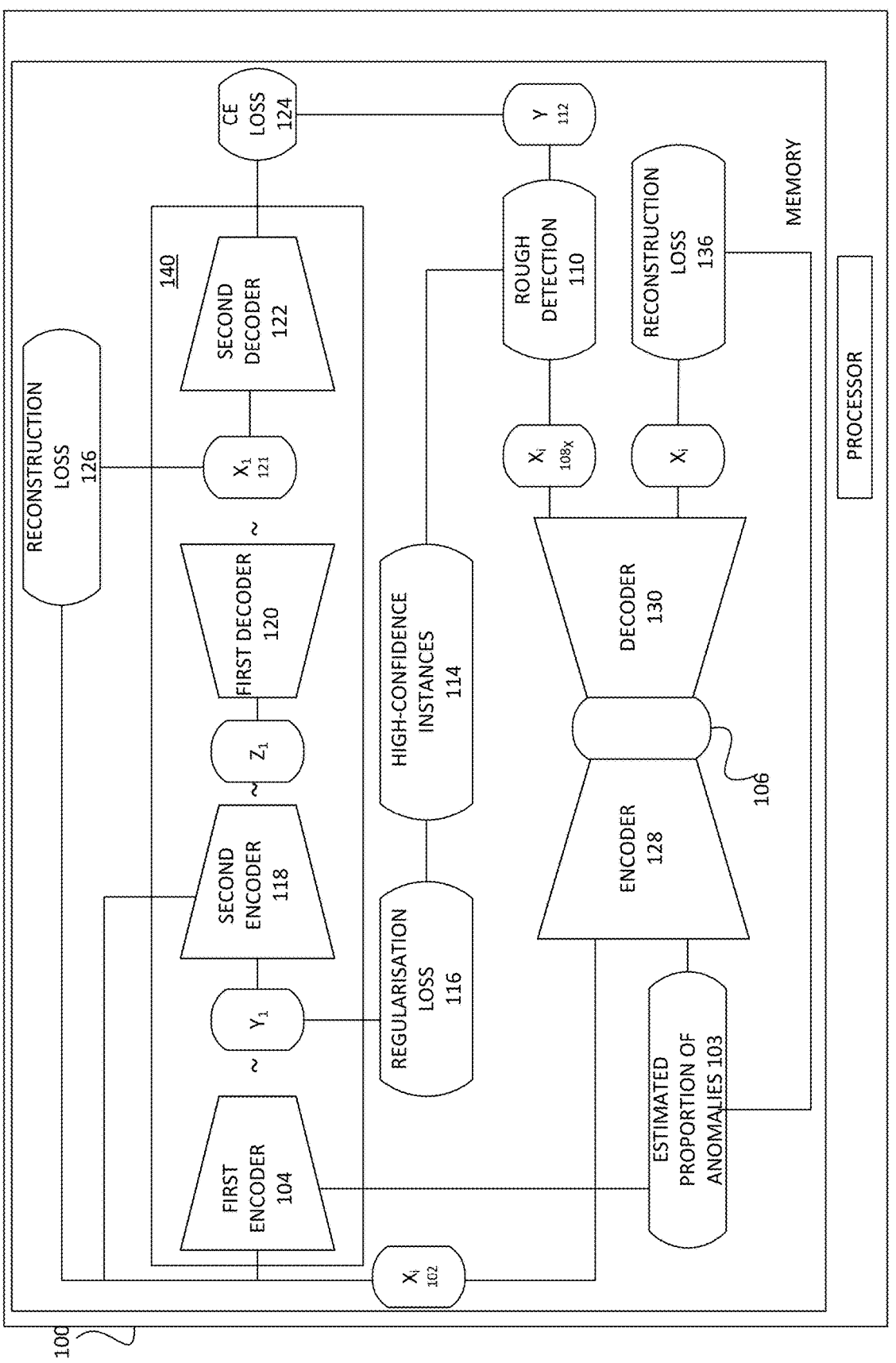
FIG. 1 is a simplified diagram illustrating an example of a system for iteratively training an anomaly detection model, according to one embodiment described herein.

In the figures, elements having the same designations have the same or similar functions.

DETAILED DESCRIPTION

As used herein, the term "network" may comprise any hardware or software-based framework that includes any artificial intelligence network or system, neural network, or system and/or any training or learning models implemented thereon or therewith.

As used herein, the term "module" may comprise hardware or software-based framework that performs one or more functions. In some embodiments, the module may be implemented on one or more neural networks.

Anomaly detection is used to identify data points in a data set that deviate from a regular distribution or a normative behavior. Existing anomaly detection methods require an estimated probability of anomalies in a probability distribution to identify data points that deviate from the probability distribution. The existing systems require as an input this probability of the behavior being outside the distribution curve or decision boundary. In existing systems, this probability of behavior being outside the decision boundary is obtained as a contamination parameter or threshold which indicates the percentage of values in the dataset that are outliers. In an example, an email spam detection system the system administrator may assign a value to the contamination parameter as five percentage based on his historical experience.

Existing systems may be inaccurate when they receive an inaccurate contamination parameter as an input. For example, if the contamination parameter is larger than the actual distribution of anomalies, the anomaly detection may result in false positive anomalies and if the contamination parameter is smaller than the actual distribution of anomalies, the anomaly detection may result in missed anomalies. This is particularly problematic as the anomalies are generated in real-time and there is no labeled data of anomalies.

In view of the possible inaccuracies in the current anomaly detection systems, embodiments provide a mechanism of training an anomaly detection model based on an inlier model and a causality-based label-noise model. Specifically, an anomaly detector is trained by iteratively operating the inlier model (e.g., an autoencoder) and the causality-based label-noise model. The output of one of the two models is used to re-train the other model iteratively until the output of the models converge to within a convergence threshold. In some embodiment, constructed noisy labels may be generated using the inlier model to train the anomaly detection models to identify an anomaly threshold. The anomaly threshold may then be used to determine an anomaly in response to an input.

For example, a system determines an initial inlier model based on an initial probability that an instance in the dataset of instances is an anomaly. The system determines a set of high-confidence instances that is a subset of instances in the dataset based on the inlier model. The system trains a causality-based label-noise model based at least in part on the set of noisy labels and the determined high-confidence instances. The system determines an estimated proportion of anomalies in the dataset based on the trailed causality-based label-noise model. The system retrains the inlier model based on the inlier samples estimated via the causality-based label-noise model in the dataset. The system iteratively, retrains the two models until the outputs of the two models converge within the convergence threshold. The system determines an anomaly detector model based on the trained causality-based label-noise model, that estimates the probability that a data point in a dataset is an anomaly.

The system trains an anomaly detection model that may automatically determines a decision boundary that demarcates the anomalies in the dataset, which deceases the error introduced by a contamination parameter in prior systems.

The system performs unsupervised anomaly detection based on instance-dependent label-noise learning. The system adapts a label-noise learning model in anomaly detection and then uses the model as a module to detect anomalies. The system uses a modified label-noise model and an inlier model for estimating the distribution of regular instances. The system uses the iterative training between the outputs of the two models to automatically determine the proportion of anomalies given a rough guess contamination parameter. This iterative training produces superior performance compared to previous approaches in terms of area under the curve (AUC) and F1 scores on both simulated and public datasets.

To reduce the error associated with the initial probability of anomalies, the system may determine an estimated probability of anomalies after retraining the causality-based label-noise model based on the inlier model. The system may determine the estimated probability of anomalies after a cycle of iterative retraining based on the outputs of the two models to reduce the error associated with the initial probability of anomalies at each cycle of iterative retraining. The system may determine an estimated proportion of anomalies in the dataset based on the trained causality-based label-noise model.

FIG. 1 is a simplified diagram illustrating a system for iteratively training an anomaly detection model, according to one embodiment described herein. As shown in FIG. 1, the system 100 includes, a processor and a memory described herein below with reference to FIG. 4. In an example, the memory may be a non-transitory, tangible, machine readable media described herein below with reference to FIG. 4 that includes executable code that when run by one or more processors may cause the one or more processors to perform the methods described herein. In an example, the system 100 may train and store or more machine learning models.

In an example, the system 100 includes in the memory an inlier model 106 and a causality-based label-model 140. The causality-based label-model 140 includes a first encoder 104, a second encoder 118, a first decoder 120 and second decoder 122. The inlier model 106 includes an encoder 128 and a decoder 130. In an example, the inlier model 106 may be an autoencoder that produces the same output as the input.

In one embodiment, the system 100 may receive a dataset of instances 102 and aim at determining whether the instances 102 contain any anomalies. For example, the system 100 may receive a dataset of instances $X=\{x_1, \ldots, x_n\}$ (shown as 102), a guess contamination parameter $\rho$, and a set of regularization weights $\lambda_1=10^{-1}$, $\lambda_2=10^{-3}$, to train an anomaly detection model $q_{\phi_1}(y|X)$ (shown as 104.) In an example, the anomaly detection model 104 may be part of a causality-based label-noise model 140.

The system 100 initializes an inlier model 106 with the instances X and train the inlier model. The system 100 may then determine a regularization term based on a certain initial probability. For example, the system may determine the regularization term based on the probability that an instance is an anomaly to $p(y=1)=0.5$, i.e., half of the instances are anomalies.

The system 100 determines noisy labels $\tilde{Y}$ for the instances Xi 102 based on initialized inlier model 106 and the contamination parameter $\rho$. The system 100 may determine a set of high confidence instances 114 based on the inlier mode 106. To determine the high confidence instances 114 the system 100 may determine the high-confidence inliers and high confidence outliers. For example, the system 100 may determine a set of inlier instances that are a percentile threshold away from a boundary layer between outliers and inliers, wherein the boundary layer is determined based on the set of noisy labels generated by the inlier model 106. The system may determine the boundary layer using a rough detection 110. The system 100 may determine a set of outlier instances that are a percentile threshold away from a boundary layer between outliers and inliers, wherein the boundary layer is determined based on the set of noisy labels using the rough detection 110. The system 100 may determine the set of high-confidence instances based on the set of inlier instances and the set of outlier instances.

In an example, the system 100 may determine the noisy labels $\tilde{Y}$ 112 from the initialized inlier model 106 based on the contamination parameter. For example, the system may determine the noisy labels $\tilde{Y}$ based on the rough detection 110. For example, the system may determine the set of noisy labels $\tilde{Y}$ using the formula for rough detection 110, i.e., $\|x_i - \widetilde{x_i}\|_2$, where $\widetilde{x_i}$ is an output 108 of the inlier model 106 and $x_i$ is the input 102 of the inlier model 106.

For example, the system 100 may determine the noisy labels that are associated with anomalies based on the rough estimation using the formula $\{(x_1, 1):\|x_i - \widetilde{x_i}\|_2 > \max\{95, 100(1-\rho)\}$-percentile$\}$, where $\rho$ is the contamination parameter which is initially set as 0.5. In an example, the system may determine the noisy labels that are associated with the inliers based on the rough estimation using the formula $\{(x_i, 0):\|x_i - \tilde{x}_i\|_2 < 40$-percentile$\}$. The system 100 may then determine the high confidence instance as a set with both the inliers and outliers. For example, the system may determine the set of high confidence instances 114 based on the formula, $\mathcal{H} = \{(x_i, 0):\|x_i - \tilde{x}_i\|_2 < 40$-percentile$\} \cup \{(x_i, 1):\|x_i - \widetilde{x_i}\|_2 > \max\{95,100(1-\rho)\}$-percentile$\}$.

The system 100 may train the causality-based label-model 140 by minimizing a negative evidence lower boundary. In an example, the system may minimize the negative lower bound based on:

$$L(X, \tilde{Y}) = -E_{(z,y) \sim q_\phi(z,y|x)}\left[\log p_{\theta_1}(x \mid y, z)\right] - E_{y \sim q_{\phi_1}(y|x)}\left[\log p_{\theta_2}(\tilde{y} \mid y, x)\right] +$$

$$\lambda_1 E_{y \sim q_{\phi_1}(y|x)}\left[KL\big(q_{\phi_2}(z \mid y, x)\big) \mid p(z)\right] + \lambda_2 KL\big(q_{\phi_1}(y \mid x) \mid p(y)\big),$$

$$+ \lambda_3 \frac{1}{|\mathcal{H}|} \sum_{(x_i, y_i) \in \mathcal{H}} CE\big(y_{i,\phi_1}(y \mid x_i)\big),$$

where the first term is equivalent to minimizing the reconstruction loss 126, the second term is the cross-entropy loss 124, the third and fourth terms are KL-divergence regularization terms, and the last term is the regularization term for $\phi_1(y|x)$ 116.

In an example, the system 100 may use $\lambda_1$, $\lambda_2$, $\lambda_3$ as the regularization weights and CE denotes cross-entropy 124. In an example, the system 100 uses the cross-entropy term 124 to regularize $q_{phi_1}(y|x)$, e.g., $\lambda_3=0.1$ on the first iteration and $\lambda_3=10^{-4}$ after it.

The system then estimates the p(y), the estimated proportion of anomalies 103 after each iteration. In an example, the system does not assume the prior p(y) is a uniform distribution since p(y) corresponds to the proportion of outliers, which is to be estimated. In an example, the system estimates p(y), i.e., the proportion of outliers after each iteration, i.e., $$p(y = 1) = \&int\_\{x\} p(y = 1 \mid x) p(x) dx \approx$$

$$\left|\{x_i \in X: q_{\phi_1}(y = 1 \mid x_i) > 0.5\}\right|/|X|$$

where $|\cdot|$ is the cardinality.

The system 100 trains the inlier model 106, i.e., $\mathcal{A}$ with samples $\mathcal{J} = \{x_i \in X: q_{\phi_1}(y=1|x_i) \, 0.5\}$ by minimizing the reconstruction loss 136. In an example, the system 100 minimizes the reconstruction loss 136 by minimizing $$L(\mathcal{J}) = \frac{1}{|\mathcal{J}|} \sum_{x_i \in \mathcal{J}} \|x_i - \mathcal{A}(x_i)\|_2^2,$$

where $\mathcal{A}(x_i)$ is the reconstruction of $x_i$.

In an example, after training is complete the system 100 returns the anomaly detector model $q_{\phi_1}(y|x)$ shown as 104.

In an example the anomaly detection model 104 may be part of a causality-based label-noise model 140. The causality-based label-noise model 140 includes two encoders and two decoders.

In an example, the two encoders include the first encoder, i.e., the anomaly detection model 104 and a second encoder 118. The anomaly detection model 104 determines $q_{\phi_1}(y|X)$, i.e., a set of clean labels $y_1$ when a dataset of instances $X_i$ that includes anomalies is fed to the encoder 104. The second encoder 118 determines $q_{\phi_2}(z|y, x)$, i.e., a latent variable z based on the $q_{\phi_1}(y|X)$ determined by the anomaly detection model 104. In an example, the clean label y associated with an instance x in the set of instances, may be influenced by other variables such as the latent variable z. For example, in the case of instances x that are images of digits, the clean label y, i.e., numerical value of the digit may be influenced by the latent font style z.

In an example, the output of the anomaly detection model 104, i.e., $y_1$ may be used to determine a regularization loss 116 based the set of high-confidence instances 114 determined using the inlier model 106 as described above. In an example, the regularization loss 116 is used to regularize the anomaly detection model 104 iteratively, using the output of the inlier model 106. In other words, regularization loss 116 is used to dynamically select reliable examples to regularize the P(y|x), i.e., $q_{\phi_1}(y|x)$.

In an example, the causality-based label-noise model 140 includes a first decoder 120 and a second decoder 122 that reconstructs the input data 121 based on the output from the second encoder 118. In an example, the first decoder 120 determines $p_{\theta_1}(x|y, z)$ and the second decoder 122 that determines a noisy label $p_{\theta_2}(\hat{y}|y, x)$. The system 100 determines a reconstruction loss 126 based on set of reconstructed input data $X_1$ and the set of instances $X_i$. In an example, the system determines a set of noisy labels based on the reconstructed input data $X_1$ 121 via the second decoder 122. The system 100 then determines a CE loss 124 based on the set of noisy labels 112 determined by the inlier model 106 with the set of noisy labels determined by the second decoder 122.

The system 100 iteratively trains the causality-based label-noise model 140 based on the CE loss 124 and the regularization loss 116, i.e., minimizes $L(X, \hat{Y})$ as described herein above. In an example, the system 100 uses the cross-entropy term 124 to regularize $q_{phi_1}(y|x)$, e.g., $\lambda_3 = 0.1$ on the first iteration and $\lambda_3 = 10^{-4}$ after it.

In an example, the inlier model 106 may take a form as an auto-encoder. The auto encoder of the inlier model 106 includes an encoder 128 and a decoder 130. In an example, the encoder 128 receives the set of instances 102 from the communication interface during the first iteration, along with an initial probability that an instance in the set of instances is an anomaly. In subsequent iterations, the system 100 determines, an estimated probability p(y) 103 as described herein above, to retrain the inlier model 106 based on the output from the retrained anomaly-detection model 104.

In an example, the system 100 trains the inlier model 106 iteratively to minimize the reconstruction loss 132 by reconstructing the input data using the inlier model 106. The inlier model 106 then uses the estimated probability of anomalies 103 determined using the output from the trained anomaly detection model 104 to minimize the regularization loss L($\mathcal{I}$) as described herein above.

Figure 2:
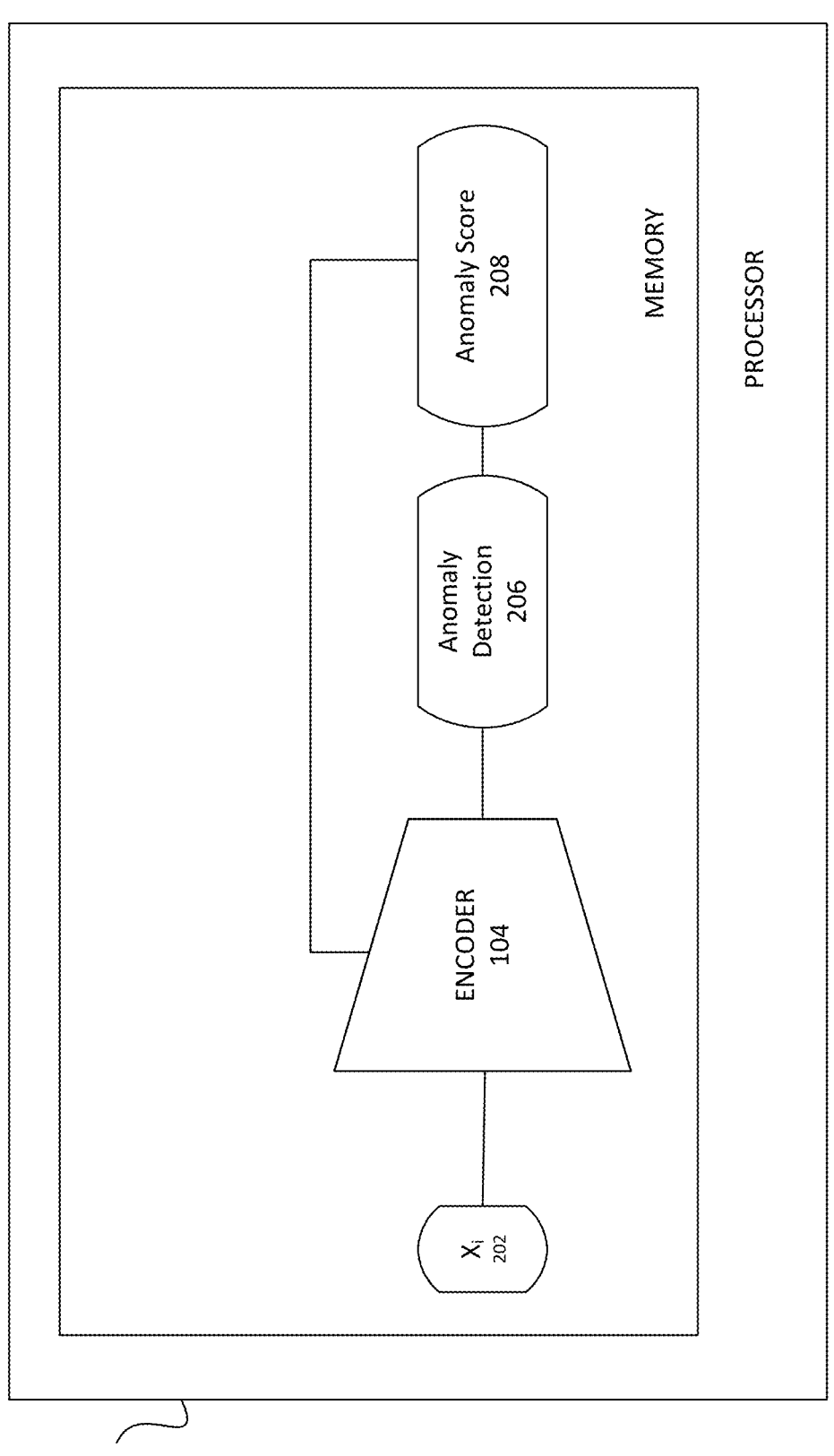
FIG. 2 is a simplified diagram illustrating an example of a system for anomaly detection using the anomaly model, according to one embodiment described herein.

FIG. 2 is a simplified diagram illustrating an example architecture of an anomaly detection model, according to one embodiment described herein. As shown in FIG. 2, the system 200 includes, a processor and a memory described herein below with reference to FIG. 4. In an example, the system 200 receives a query via a communication interface. The anomaly detection model 104 determines whether an instance in a query is an anomaly. For example, the anomaly detection model 104 may determine whether the instances $x_i$ in the query are anomalies based on the formula:

$$\{x_i \in X : q_{\phi_1}(y=1|x_i) > 0.5\}$$

shown as 206 in the FIG. 2.

In an example, the anomaly detection model 104 may determine the anomaly score for the instance based on the formula: $-\log(q_{\phi_1}(y=0|x))$ shown as 208 in FIG. 2.

In an example, given a dataset of instances, the system 200 may use the anomaly detection model 104 to determine anomalies in the dataset of instances based on the formula listed above. In another example, the system 200 may determine via the anomaly detection model, an anomaly score and based on the anomaly score determine a label for each instance in the dataset.

Figure 3:
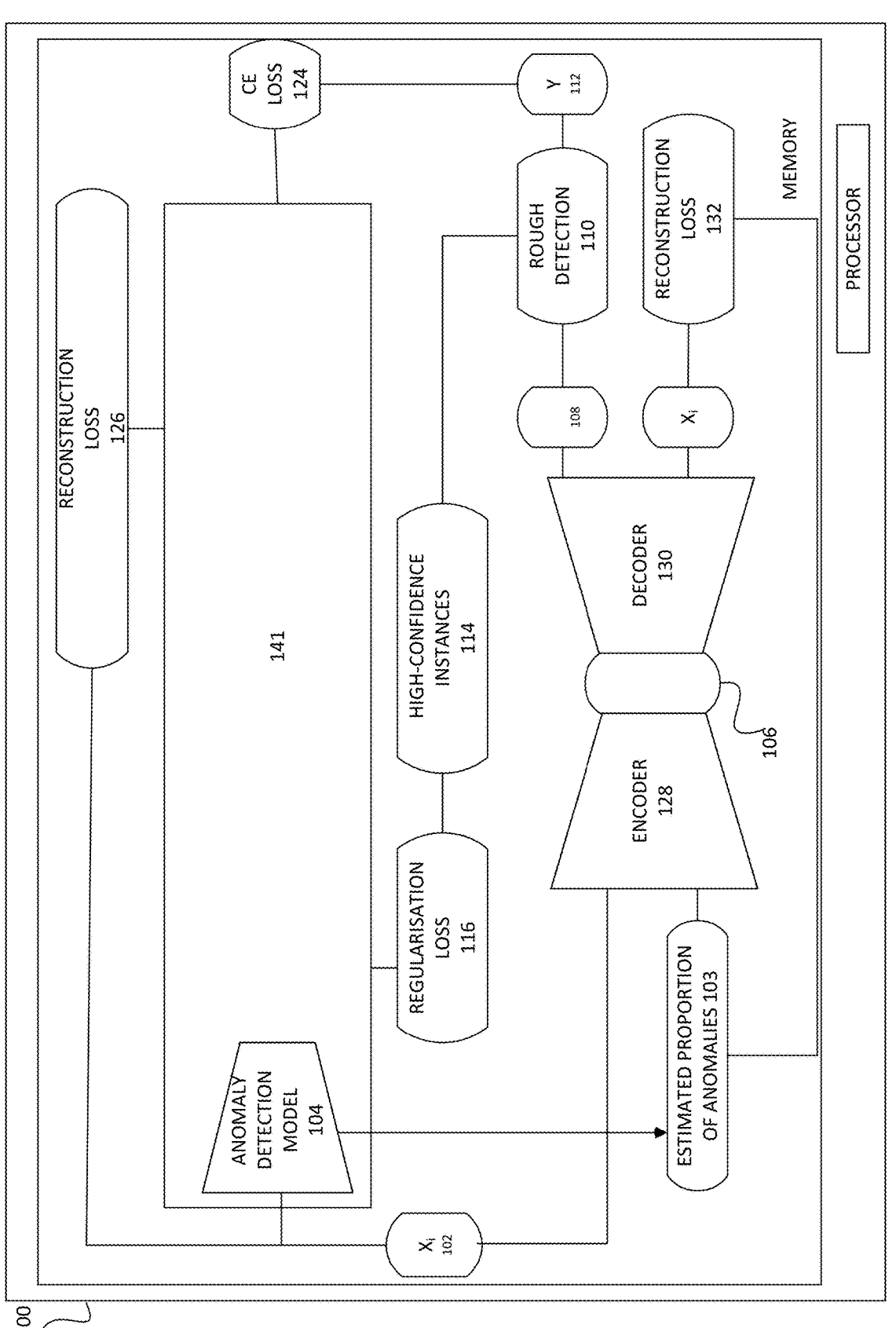
FIG. 3 is a simplified diagram illustrating an example of a system for iteratively training an anomaly detection model and determining a refined contamination parameter associated with an anomaly detection model, according to one embodiment described herein.

FIG. 3 is a simplified diagram illustrating an example of iteratively training an anomaly detection model 104 and determines a refined contamination parameter associated with the second model based on the proportion of anomalies in the second model at convergence, according to one embodiment described herein. As shown in FIG. 3, the system 100 includes, a processor and a memory described herein below with reference to FIG. 4. As shown in FIG. 3, the system 100 iteratively trains two models the inlier model 106 and a second model (e.g., an anomaly detection model) 140. In an example, the second model may be the causality-based label model 140. In an example, the second model may be a different anomaly detection model for which a refined contamination parameter is to be determined.

Examples of the second model 141 may include (Chaovalitwongse et. al. On the Time Series K-Nearest Neighbor Classification of Abnormal Brain Activity. IEEE Transactions on Systems, Man, and Cybernetic-Part A: Systems and Humans, (Chaovalitwongse et. al. 200737(6): 1005-1016, 2007), (Angiulli et. al. 2002 Fast Outlier Detection in High Dimensional Spaces. In Principles of Data Mining a Knowledge Discovery, 15-27), One-Class SVM (Manevitz et al., One-Class SVMs for Document Classification. J. Mach. Learn. Res., 2: 139-154, 2002), probabilistic methods (Chandola et al. Anomaly Detection: A Survey. 41(3)2009, LiZBIH20), high-dimensional case (Sohn et. al. Learning and Evaluating Representations for Deep OneClass Classification. ICLR'212021), DAGMM (Zong et. al., Deep Auto-encoding Gaussian Mixture Model for Unsupervised Anomaly Detection. In International Conference on Learning Representations, 2018), LSTM-VAE (Park et. al., A Multimodal Anomaly Detector for Robot-Assisted Feeding Using an LSTM-Based Variational Autoencoder. IEEE Robotics and Automation Letters, PP. 2017), OmniAnomaly (Zhao et. al., Robust Anomaly Detection for Multivariate Time Series through Stochastic Recurrent Neural Network. In 25th ACM SIGKDD Intl Conference on Knowledge Discovery & Data Mining, KDD'19, 2828-2837.2019) and USAD (Audibert et. al., USAD: UnSupervised Anomaly Detection on Multivariate Time Series. In The 26th ACM SIGKDD Intl Conference on Knowledge Discovery & Data Mining, KDD'20, 3395-34042020).

The system 100 receives a dataset of instances 102 that includes anomalies. The system 100 trains an inlier model 106 initially based on a guess probability of the percentage of anomalies. In an example, the guess probability of the percentage of anomalies in the set of instances 102 is fifty percentage, i.e., 0.5.

The system 100 determines via the inlier model 106 a set of high-confidence instances 114 that identify instances in the dataset of instances that are located a threshold percentile away from the decision boundary of the inlier model 106, wherein the inlier model 106 provides a set of noisy labels that identifies whether an instance is an anomaly. In an example, the threshold percentile boundary is such that the threshold may distinguish between the anomalies and the inliers without undue use of computing power.

In an example, the system 100 uses a guess probability to eliminate instances that are closed to the decision boundary of the inlier model 106. For example, an instance that is close to the decision boundary is more likely to be mislabeled compared to an instance away from the decision boundary. In an example, the system 100 determines the set of high confidence instances 114, that includes both the inliers and outliers based on the formula, $\mathcal{H} = \{(x_i, 0):\|x_i - \tilde{x}_i\|_2 < 40\text{-percentile}\} \cup \{(x_i, 1):\|x_i - \widetilde{x_i}\|_2 > \max\{95,100(1-\rho)\}\text{-percentile}\}$.

The system 100 then trains the second model 141, which includes the anomaly detection model 104 based at least in part on the high-confidence instances 114, the set of noisy labels 112 and the dataset of instances 102. In an example, for training the system 100 determines the regularization loss 116, the cross-entropy loss 124 and the reconstruction loss 126 as discussed below.

In an example, the system 100 determines the regularization loss 116 based on the high-confidence instances 114. In an example, the system minimizes the error in the anomaly detection model 104 based on a regularization loss 116.

In an example, the system 100 determines a cross entropy loss 124 based an output from the inlier model 106. In an example, the output from the inlier model 106 may be used to determine a set of clean labels $Y_i$ (shown as 112) using a rough detection 110. The system 100 determines the cross-entropy loss 124 based on the set of clean labels 112 based on the inlier model 106 and the set of latent clean labels determined using the second model 141. The system 100 may retrain the anomaly detection model 104 based on minimizing the cross-entropy loss 124.

In an example, the system 100 may determine a reconstruction loss 126 by reconstructing the input data based on the output of the anomaly detection model 104. In an example, the system 100 may determine the reconstruction loss 126 as described above with respect to FIG. 1, in the case of a causality-based label-noise model. The system 100 may retrain the anomaly detection model 104 based on minimizing the reconstruction loss 126.

The system 100 determines an estimated proportion of anomalies 103 in the dataset based on the trained second model 140 (or the anomaly detection model 104). In an example, the system 100 determines the estimated proportion of anomalies 103 after each iteration based on the formula p(y=1) as described herein above with reference to FIG. 1 when the second model is a causality-based label-noise model. In an example, the system 100 automatically determines the probability of the estimated proportion of anomalies 103 at each iteration when iteratively training the second model 141 and the inlier model 106 instead of using a guess contamination parameter after the first iteration. The system 100 may improve the accuracy of the determination of the boundary in the inlier model by moving away from the error introduced by the guess contamination parameter during the iterative retraining process.

The system 100 retrains the inlier model 106 based on the estimated proportion of anomalies 103 in the dataset. In an example, system 100 retrains the inlier model 106 using the dataset of instances 102 with anomalies and the estimated proportion of anomalies 103. In an example, the system 100 may use the potential inliers identified based on the p(y=1) 103 for retraining the inlier model 106. For example, the system 100 may determine potential inliers using the formula $\mathcal{J} = \{x_i \in X : q_{\phi_1}(y=1|x_i) < 0.5\}$ given the p(y=1). In other words, the inlier model 106 is trained based on the estimated proportion of anomalies 103 determined after each iteration, which in turn is based on the proportion of anomalies determined using the second model 141.

In an example, the system 100 then determines whether the output of the inlier model 106 and the anomaly detection model 104 converge to within a convergence threshold. In an example, the convergence threshold may be based on a threshold that does not cause an undue increase in CPU or GPU utilization during training without a proportional increase in accuracy of the boundary of the anomaly detection model 106.

In an example, the system 100 iteratively retrains the inlier model 106 and the causality-based label-noise model 140 based on the output from the respective retrained models, in response to a determination that the output of the inlier model 106 and the causality-based label-noise model 140 does not converge to within a convergence threshold.

In order to iteratively retrain, the inlier model 106 and the second model 141, the system 100 may determine a cross-entropy loss 124 and a regularization loss 116 based on the output of the inlier model 106. For example, the system may determine via the trained inlier model 106 a set of noisy labels 108 that corresponds to anomalies in the dataset of instances 102. In an example, the system 100 may determine a set of high-confidence instances based on the output of the inlier model 106 as described above with respect to FIG. 1

In an example, the system 100 may train a second model 141 (e.g., causality-based label-noise model 140) based at least in part on the set of noisy labels 112 and the determined high-confidence instances 114. For example, the system 100 may determine the regularization loss 116 based on the set of high-confidence instances 114 and a cross-entropy loss 124 based on the set of noisy labels 112. The system may then train the second model 141 based on the dataset of instances 102 to minimize the regularization loss 116 and the cross-entropy loss 124. In an example, the system 100 may determine a reconstruction loss 126 based on the output of the anomaly detection model 104 as described above with respect to FIG. 1 and retrain the anomaly detection model 104 to minimize the reconstruction loss 126.

In an example, the system 100 may determine an estimated proportion of anomalies 103 in the dataset based on the trained second model 141 (e.g., causality-based label-noise model 140 of FIG. 1). For example, the system 100 may determine the estimated proportion of anomalies 103 based on the output from the first encoder, i.e., the anomaly detection model 104. In an example, the system 100 may retrain the inlier model 106 based on the estimated portion of anomalies 103 in the dataset.

In an example, then system 100 may determine whether a set of clean label outputs from the retrained inlier model 106 and a set of noisy label outputs from the trained causality-based label-noise model 140 are within a convergence threshold. In an example, the system 100 may based on a determination that outputs of the retrained inlier model 106 and the second model 141 (e.g., the trained causality-based label-noise model 140) are not within the convergence threshold, iteratively retrain in a feedback loop the second model 141 (e.g., the causality-based label-noise model 140) using the output of the retrained inlier model and the retrained inlier model using the output of the second model 141 (e.g., the causality-based label-noise model 140) until the outputs of the two models converge within the convergence threshold. In an example, the system 100 may determine an anomaly detector model 104 that estimates the probability that a data point in a dataset is an anomaly based on the causality-based label-noise model 140 after convergence.

In an example, the system 100 may determine a trained anomaly detection model 104 from the causality-based label-noise model 140 that estimates the probability that an instance in the dataset of instances is an anomaly, based on the determination that the output of the inlier model 106 and the second model 141 (e.g., the causality-based label-noise model 140) coverages. For example, the system may determine that the first encoder, i.e., the anomaly detection model 104 from the second model 141 such as the causality-based label noise model 140 is the trained anomaly-detection model 104 after convergence. In an example, the rest of the encoders and decoders in the second model 141 such as the causality-based label noise model 140 are not used in estimating the probability that an instance in the dataset is an anomaly.

In an example, for training the anomaly detection model 140 the system 100 may determine a regularization loss 116 based on the set of high-confidence instances 114 and a set of clean labels determined via the second model 141 such as the causality-based label-noise model 140. For example, the system may determine whether the set of clean labels from the anomaly detection model 104 in the second model 141 such as the causality-based label-noise model 140 mis-labels the inliers or outliers in the set of high-confidence instances.

In an example, the system 100 may determine a cross-entropy loss 124. The system may reconstruct input data based on the output of the anomaly detection model 104. The system 100 may determine a set of noisy labels generated based on the reconstructed input data based on the output of the anomaly detection model 104. In an example, as described herein above with respect to FIG. 1, in a causality-based label-noise model 140, a second encoder 118, a first decoder 120 and a second decoder 122 may be used to reconstruct a set of noisy labels. The system 100 may similarly determine a set of noisy labels 112 based on the inlier model 106. For example, the system 100 may determine a rough detection 110 that transforms the output of the inlier model 106 into a set of noisy labels. The system 100 may compare the reconstructed set of noisy labels to the set of noisy labels generated based on the inlier model to determine the cross-entropy loss 124. The system 100 may retrain the anomaly detection model 104 based on minimizing the reconstruction loss 126 and the cross-entropy loss 124.

In an example, the system 100 may determine a reconstruction loss 126 based on a reconstructed dataset of instances and the dataset of instances 102. For example, as described above with reference to FIG. 1, the system 100 may pass the output of the anomaly detection model 104 to a second encoder 118 and a first decoder 120 to reconstruct the output of the anomaly detection model 104. In an example, the system 100 may retrain the anomaly detection model 104 based on minimizing the reconstruction loss 126.

In an example, the system 100 may determine a set of high-confidence instances 114 based on how far away the instances are from a decision boundary. For example, the system 100 may determine a set of inlier instances that are a percentile threshold away from a boundary layer between outliers and inliers. In an example, the system 100 may determine the boundary layer between the inliers and the outliers based on the set of noisy labels. In an example, the system 100 may determine a set of outlier instances that a percentile threshold away from a boundary layer between outliers and inliers, wherein the boundary layer is determined based on the set of noisy labels from the inlier model. The system 100 may determine the set of high-confidence instances 114 based on the set of inlier instances and the set of outlier instances.

In an example, the system 100 may receive, via the communication interface, an initial probability of anomalies. The system 100 may initialize the inlier model 106 with the dataset of instances 102. For example, the inlier model 106 may be an auto-encoder. In an example, an auto-encoder includes an encoder and a decoder pair with a constraint. The auto-encoder aims to match the input and the output. The constraint of the auto-encoder may allow the auto-encoder to determine a set of latent properties associated with the inputs.

In an example, the system 100 may reconstruct a reconstructed dataset of instances based on the noisy label from the inlier model 106. The system 100 may determine an inlier reconstruction loss 136 based on the estimated proportion of anomalies in the dataset. The system may retrain the inlier model 106 based on the inlier reconstruction loss 136.

In an example, the system 100 may determine, via the inlier model 106, the set of noisy labels 112 that correspond to anomalies in the dataset of instances based on the output 108 of the inlier model. The system 100 may determine whether an instance in the dataset of instances 102 is an inlier based on a boundary layer of anomalies in the inlier model 106, wherein the boundary layer of anomalies in the inlier model 106 is trained based on a probability of anomalies. The system 100 may determine a label associated with a dataset in the dataset of instances based on the determined probability. The system 100 may determine a set of noisy labels that correspond to anomalies in the dataset of instances.

In an example, the probability of anomalies is an initial probability of anomalies, i.e., the contamination parameter obtained during the initialization of the inlier model 106. In an example, the probability of anomalies is the estimated probability of anomalies 1-3 during the retraining of the inlier model 106 based on the output of the second model 141.

Computing Environment

Figure 4:
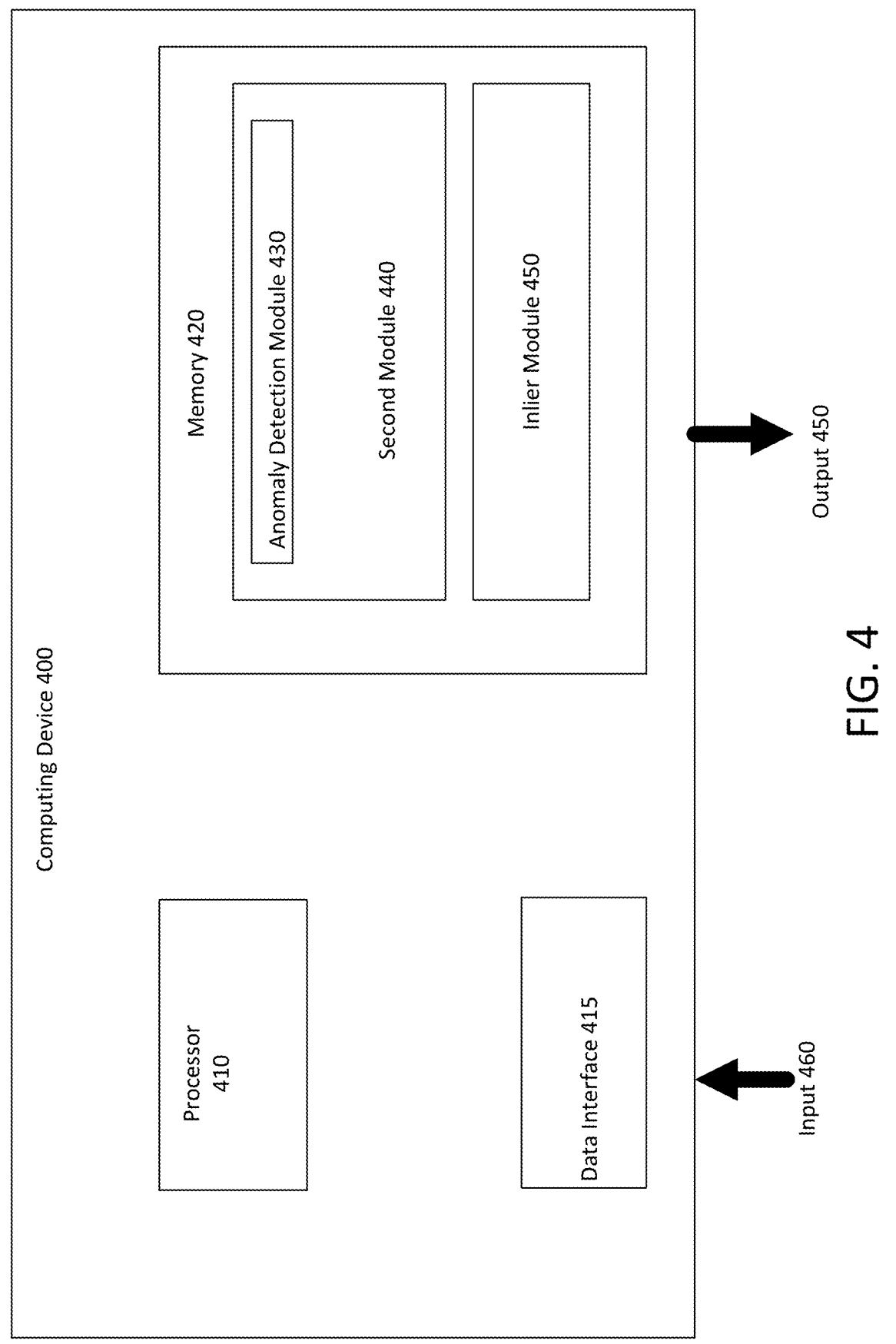
FIG. 4 is a simplified diagram of a computing device that implements the method of generating an anomaly detection model, according to some embodiments described herein.

FIG. 4 is a simplified diagram of a computing device that implements the training of an anomaly detection model, according to some embodiments described herein. As shown in FIG. 4, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip, or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for an anomaly detection module 430 that may be used to implement and/or emulate the systems and models, and/or to implement any of the methods described further herein. In some examples, the anomaly detection module 430, may receive an input 440, e.g., such as a set of instances with anomalies, via a data interface 415. The data interface 415 may be any of a user interface that receives a set of instances, or a communication interface that may receive or retrieve a previously stored set of instances from the database. The anomaly detection module 430 may generate an output 450, such as a set of labels associated with the instances received as input to the input 440.

In one embodiment, memory 420 may store an anomaly detection model, such as the anomaly detection model 104 described in FIG. 1. For example, the anomaly detection module 430 may include a set of instructions that trains the anomaly detection model 104 and runs the anomaly detection model 104. In an example, the anomaly detection module 430 may be part of a second module 440 which includes additional components such as the second encoder, the first decoder and the second decoder described in FIG. 1. For example, the second module 440 may include instructions that trains and runs the causality-based label model 140 as described above with reference to FIG. 1. In another embodiment, processor 410 may access an anomaly detection model 104 stored at a remote server via the communication interface 415.

In some embodiments, the anomaly detection module 430 may further includes the second module 440 and an inlier module 450. The second module 440 (which is similar to the second model 141 in FIG. 3) is configured to determine whether an instance in a dataset of instances is an anomaly. The inlier module 450 (which is similar to the inlier model 106 in FIG. 3) is configured to determine whether an instance in a dataset of instances is an anomaly based on an auto-encoder.

In one implementation, the anomaly detection module 430 and its submodules 631-632 may be implemented via software, hardware and/or a combination thereof.

Some examples of computing devices, such as computing device 400 may include non-transitory, tangible, machine readable media that include executable code that when run by one or more processors (e.g., processor 410) may cause the one or more processors to perform the processes of methods 500-600 discussed in relation to FIGS. 5 and 6. Some common forms of machine readable media that may include the processes of methods 500 and 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Example Workflows

FIG. 5 is a simplified logic flow diagram illustrating an example process 500 for training an anomaly model using the framework shown in FIGS. 1-3, according to embodiments described herein. One or more of the processes of method 500 may be implemented, at least in part, in the form of executable code stored on non-transitory, tangible, machine-readable media that when run by one or more processors may cause the one or more processors to perform one or more of the processes. In some embodiments, method 500 corresponds to the operation of the anomaly detection module 430 (FIG. 4) to perform the task of training an anomaly detection model.

At step 502, a dataset of instances (e.g., 102 in FIG. 1, FIG. 3) that includes anomalies is receives via a communication interface (e.g., 415 in FIG. 4). For example, the dataset of instances may include a set of emails that include an anomaly, i.e., spam emails.

At step 504, a set of noisy labels that corresponds to anomalies in the dataset of instances (e.g., 102 in FIG. 3) and a set of high-confidence instances (e.g., 114 in FIG. 4) are determined via the inlier model (e.g., 106 in FIG. 1, FIG. 3). For example, the inlier model 450 may determine a set of noisy labels 112 for a given dataset of instances. The inlier model (e.g., 450 in FIG. 4) may determine the set of high-confidence instances (e.g., 114 in FIG. 3) based on instances that are labeled as anomalies that are further away from the boundary layer between anomalies and inliers in the inlier model 106.

At step 506, a causality-based label-noise model is trained based at least in part on the set of noisy labels and the set of high-confidence instances. For example, the causality-based label-noise model 140 shown in FIG. 3 is trained based on the set of noisy labels 112 and the set of high-confidence instances 114. The set of noisy labels is used to determine a cross-entropy loss 124. The set of high-confidence instances is used to determine a regularization loss 116 as shown in FIG. 3.

At step 508, an estimated proportion of anomalies (e.g., 103 in FIGS. 1 and 3) in the dataset of instances (e.g., 102 in FIGS. 1 and 3) is determined based on the trained causality-based label-noise model (e.g., 140 in FIGS. 1 and 3).

At step 510, the inlier model (e.g., 106 in FIGS. 1 and 3) is retrained based on the estimated inlier samples in the dataset of instances, wherein the estimated inlier samples is determined based on the estimated proportion of anomalies (e.g., 103 in FIGS. 1 and 3) in the dataset of anomalies.

At step 512, the inlier model (e.g., 106 in FIGS. 1 and 3) and the causality-based label-noise model (e.g., 140 in FIGS. 1 and 3) are iteratively retrained based on the output from the corresponding retrained models based on a determination that the output of the inlier model and the causality-based label-noise model do not converge to within the convergence threshold.

FIG. 6 is a simplified logic flow diagram illustrating an example process 620 of training an anomaly detection model, according to embodiments described herein. One or more of the processes of method 620 may be implemented, at least in part, in the form of executable code stored on non-transitory, tangible, machine-readable media that when run by one or more processors may cause the one or more processors to perform one or more of the processes. In some embodiments, method 620 corresponds to the operation of anomaly detection module 430 (FIG. 4) to perform the task of iteratively training an anomaly detection model based on iteratively feeding the output of an inlier model to the input of a second model, and the output of the second model back to the input of the inlier model.

At step 602, module 430 may receive, via a communications interface, a dataset of instances (e.g., 102 in FIG. 1, 3) that includes anomalies.

At step 604, module 430 may determine, via, an inlier model (e.g., 106) a set of noisy labels that identify anomalies in the dataset of instances based on a contamination parameter. In an example, the contamination parameter may be an initial probability. In an example, the contamination parameter may be an estimated probability of anomalies based on a second model (e.g., 103 in FIG. 3.)

At step 606, module 430 may determine a high-confidence instance based on the inlier model (e.g., 116 in FIG. 1 and FIG. 3) based on the inlier model. For example, the module 430 may determine the high-confidence instance based on instances that are inliers or outliers that are not close to a decision boundary in the inlier model. The module 430 may determine the distance from the decision boundary based on a percentile threshold as described above with reference to FIG. 1 and FIG. 3.

At step 608, module 430 may train a second anomaly detection model (e.g., 140 in FIG. 3) based on the set of noisy labels that identifies a set of anomalies in the dataset of instances.

At step 610, the module 430 may determine an intermediate probability of anomalies 103 in the dataset of instances based on the trained second model (e.g., 140 in FIG. 3).

At step 612, the module 430 may determine whether the set of noisy labels based on the inlier model (e.g., 106 in FIG. 1 and FIG. 3) the intermediate clean label set based on the second model (e.g., 140 in FIG. 3) are within a convergence threshold.

At step 614, the module 430 may based on a determination that the noisy labels and the intermediate clean labels set are not within a convergence threshold, iteratively retraining the inlier model (e.g., 106 in FIG. 1 and FIG. 3) based on the set of intermediate clean labels, and retraining the second model (e.g., 140 in FIG. 3) based on noisy labels and high confidence instances obtained from the inlier model in a feedback loop linked to the determination of whether the nosily labels and the set of intermediate clean labels are within the convergence threshold.

At step 616, the module 430 may determine a refined contamination parameter (e.g., 103) after training associated with the second model based on the probability of anomalies in the second label at convergence.

Example Performance

The performance of the trained anomaly detection model is compared to prior anomaly detection models including COPOD (Li et al., Copula-Based Outlier Detection, In Plant, C. Wang, H.; Cuzzocrea, A.; Zaniolo, C.; and Wu, X., eds., 20th IEEE International Conference on Data Mining, ICDM 2020, Sorrento, Italy, Nov. 17-20, 2020, 1118-1123. IEEE, 2020), LOF (Brewing et al., Identifying Density-Based Local Outliers. SIGMOD Rec., 29(2): 93-104, 2000), LODA (Pevny et. al., Lightweight on-Line Detector of Anomalies. Mach. Learn., 102(2): 275-304, 2016), OCSVM (Scholkopf et al. Support Vector Method for Novelty Detection. In Proceedings of the 12th International Conference on Neural Information Processing Systems, NIPS'99, 582-588. MIT Press 1999), isolation forest (Liu et al., Isolation Forest. In 2008 Eighth IEEE International Conference on Data Mining, 413-422, 2008), HBOS (Goldstein et. al. Histogram-based Outlier Score (HBOS): A fast Unsupervised Anomaly Detection Algorithm, 2012), AE (Baldi et. al. Autoencoders, Unsupervised Learning, and Deep Architectures. In ICML Workshop on Unsupervised and Transfer Learning, volume 27 of PMLR, 37-49. PMLR 2012) and VAE (Kingma and Welling, Auto-Encoding Variational Bayes. In 2nd International Conference on Learning Representations, ICLR 2014, Banff, A B, Canada, Apr. 14-16, 2014, Conference Track Proceedings. 2014).The anomaly detection model and system described herein may be trained and tested on DAMI dataset (Campos et al., On the evaluation of unsupervised outlier detection: measures, datasets, and an empirical study. Data Min. Knowl. Discov., 30(4): 891-927, 2016), MNIST dataset (Le-Cun et. al., MNIST handwritten digit database. ATT Labs [Online]. Available: http://yann.lecun.com/exdb/mnist, 2. 2010), Fashion MNIST (Xiao, Rasul, and Vollgraf et. al., MNIST handwritten digit database. ATT Labs [Online]. Available: http://yann.lecun.com/exdb/mnist, 2., 2017) a simulation dataset for anomalies.

Figures 7, 8:
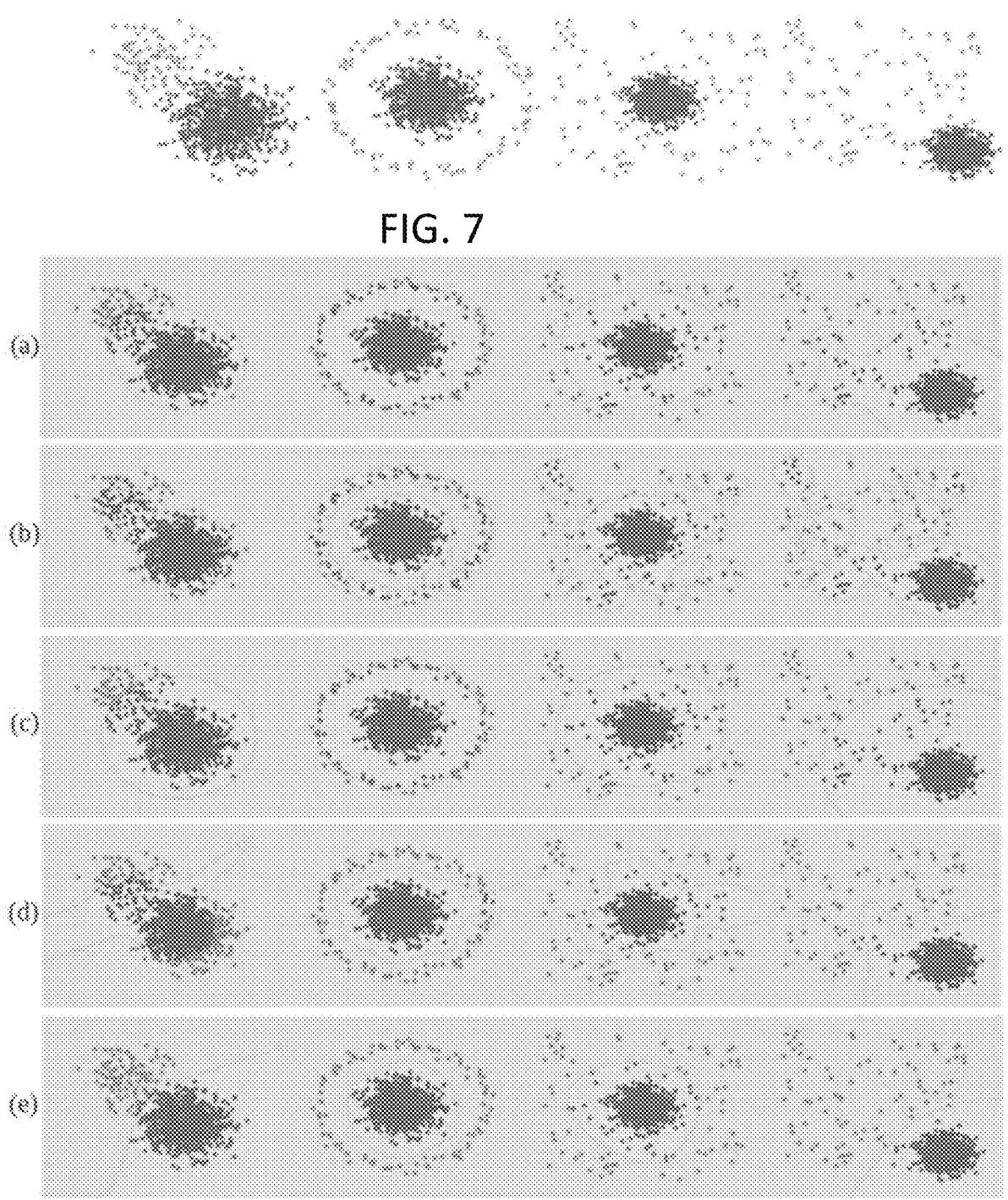

With reference to FIG. 7., the system generates data with anomalies including four simulation datasets as shown in Figure FIG. 7 that illustrates a 2-dimensional data to facilitate data visualization. With reference to FIG. 7A the system generates inliers are drawn from $\mathcal{N}([3, -3]; 0.5)$ while the outliers are drawn from $\mathcal{N}([1.5, -1.5]; 0.5)$. In some instances, there is an overlap between the inliers and the outliers. With reference to FIG. 7B, the inliers are sampled from $\mathcal{N}([0,0]; 0.5)$ while the outliers are sampled from a noisy circle with a radius 2.5. With reference to FIG. 7C, the inliers are drawn from $\mathcal{N}([0,0]; 0.5)$ and the outliers are uniformly sampled from $[-4,4]^2$ i.e., the inliers are at the center. With reference to FIG. 7D the inliers are drawn from $\mathcal{N}([3, -3]; 0.5)$ and the outliers are uniformly sampled from $[-4,4]^2$, i.e., the inliers are at the bottom right. The proportion of the outliers in these four datasets is set to 10%.

In the experiment, it is assumed that the exact proportion of outliers is unknown and initialize the contamination parameter to 0.05 for all the methods. With reference to FIGS. 10, and 11, the table in FIG. 10 and the table in FIG. 11 show the performance comparison on the simulation datasets, where the final column is the performance of the anomaly detection model 104 as shown in FIGS. 1 and 3 after training.

Besides anomaly detection methods, when the method according to an embodiment as described herein is compared with the semi-supervised learning method titled Label Propagation (Zhu et al. 2020, Zhou et al. 2004) where the labeled samples are selected by AE. The anomaly detection model training according to an embodiment outperforms all the other methods. It achieves significantly better F1 scores even though the contamination parameter is different from the exact proportion of outliers, e.g., the embodiment of the current training method obtains F1 score 0.949 for the first dataset, while the best F1 score achieved by the others is 0.667, which indicates that the embodiment of the current method is more robust performs better in spite of the difference between the contamination parameter and the exact proportion of outliers.

Figure 9:
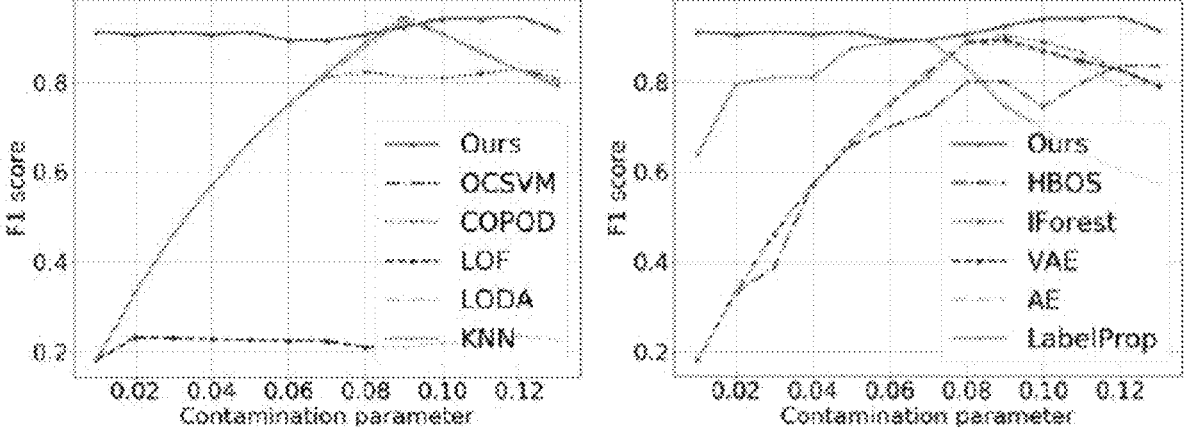

For the AUC scores which are not affected by threshold estimation, an embodiment of the current method also achieves better results, e.g., an embodiment of the current method obtains 0.999 for the first dataset, while the best AUC obtained by others is 0.997. With reference to FIG. 8., the figure plots the decision boundaries obtained by different methods. The boundaries obtained by an embodiment of the current method as shown in FIG. 8(*e*) are very close to the ground truth, i.e., almost all of the outliers are identified. FIG. 9 plots the F1-scores of these methods with different contamination parameters in Case 4. The FIG. 9 illustrates that an embodiment of the current method is stable even with the variation in contamination parameter, i.e., its performance is quite stable when this parameter changes from 0.01 to 0.13, while the other methods achieve their best performance only when the parameter is close to the exact proportion of outliers, e.g., 0.1.

In an example, ten public DAMI benchmark dataset were selected for anomaly detection performance comparison. The contamination parameter for each dataset is selected according to the proportion of the outliers, e.g., 0.1 for Glass, HeartDisease, Ionoshpere, Shuttle, Stamps, Waveform, WBC and Wilt, 0.2 for PIMA and WPBC.

With reference to FIGS. 10, 11, and 12, the tables show the AUC and F1 scores of these methods on the DAMI datasets. An embodiment of the current system and method achieves four of the best AUC scores and six of the best F1 scores, which is the best among all these approaches, e.g., the current system obtains F1 score 0.615 for HeartDisease, while the best F1 score obtained by the others is 0.536. An embodiment of the current system and method performs better than the Autoencoder anomaly detector consistently, i.e., the embodiment of the current system and method is significantly better on nine datasets. Therefore, an embodiment of the current system and method may estimate the distribution of inliers and detect outliers more accurately.

Figures 16, 17:
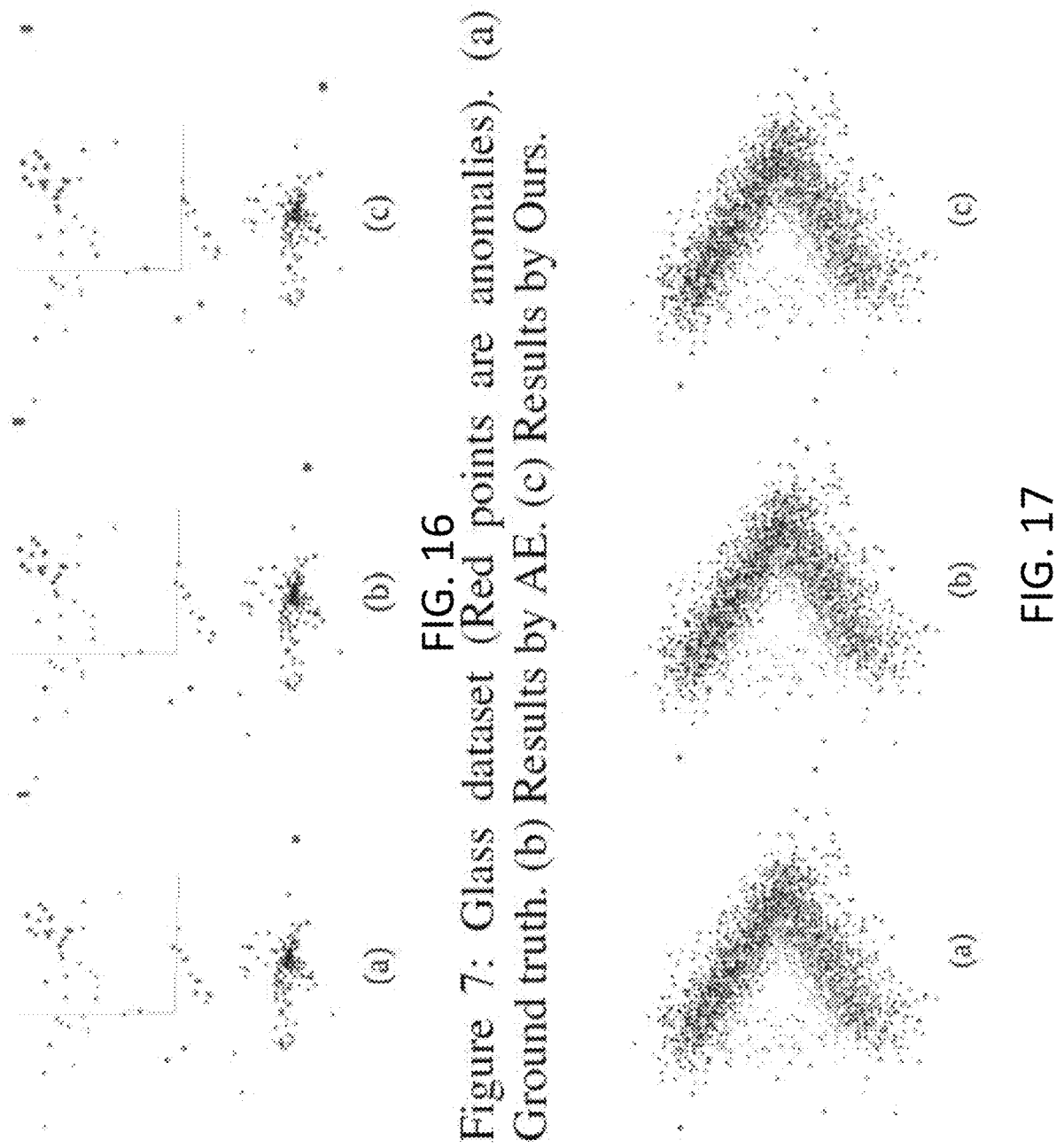

With reference to FIG. 17, the figure an example where an embodiment of the current method performs better than the others. The anomalies lie between the "V" shape. Because the inliers follow the same distribution, i.e., the "V" shape, an embodiment of the current system and method may separate those anomalies from the inlier distribution well.

Figure 18:
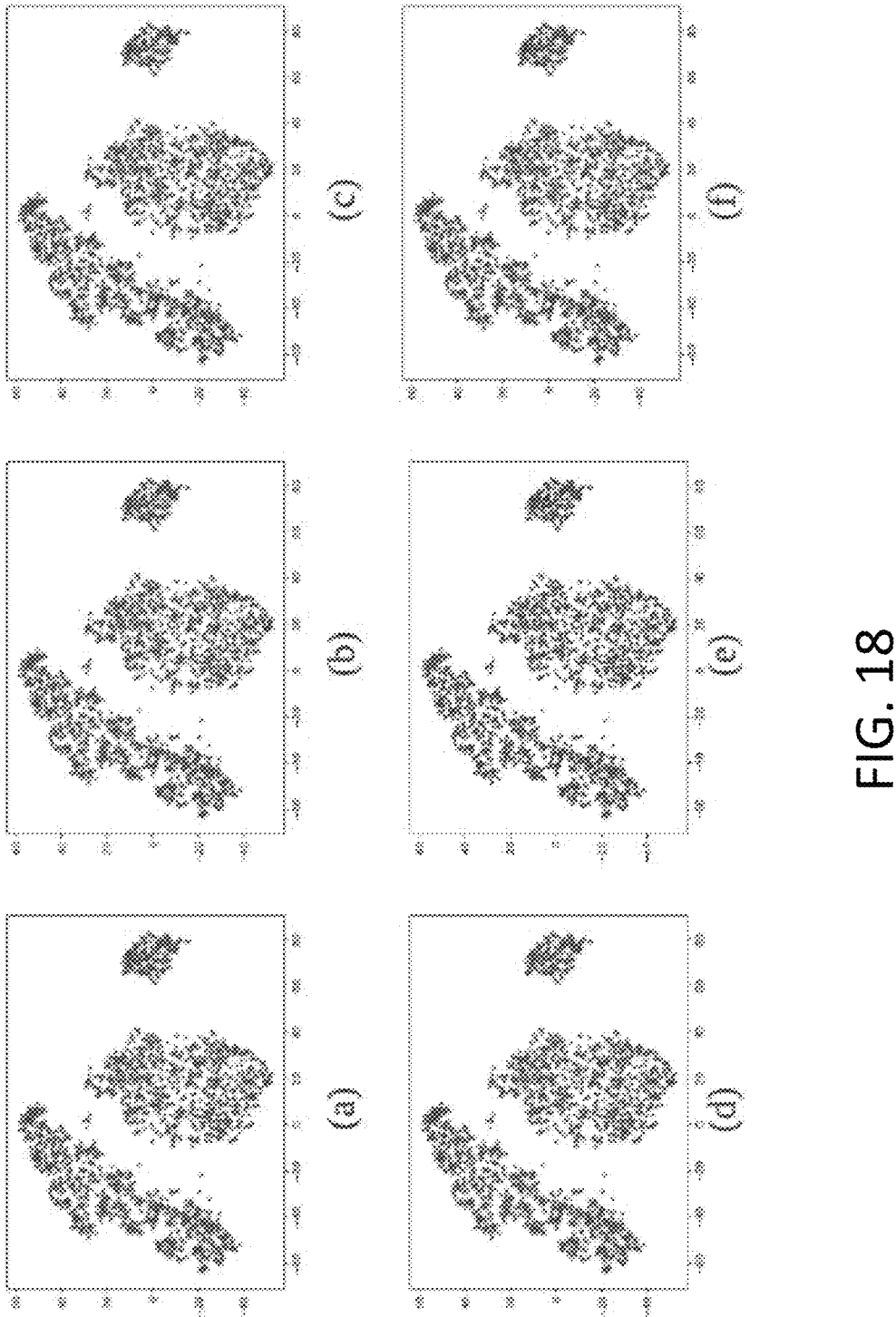

With reference to FIG. 18, the figure is an example of an MNIST and a FashionMNIST dataset. The system constructs anomaly detection datasets by following the strategies "one vs. the rest" (one class is an inlier and the rest classes are outliers) and "two vs. one" (two classes are inliers and one class is an outlier). The proportion of outliers is 0.1 for each case. In an example, the system uses 0.05 for the contamination parameter for all the methods.

Referring to FIGS. 11 and 12, the tables show the performance comparison on MNIST datasets. An embodiment of the current method achieves the best average AUC and F1 scores. Especially for F1 scores, an embodiment of the current method performs better than the others, showing that the embodiment of the current method may learn the anomaly boundary well even when the contamination parameter is not accurate. With respect to FIG. 18, the figure visualizes the detection results via the t-SNE graphs, where the red points are the detected anomalies. An embodiment of the current system and method produces an output that better simulates the ground truth resulting in better AUC and F1 scores. With respect to the AE and an embodiment of the current system and method, the embodiment of the current system and method (shown in FIG. 18.F) framework improves the performance.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth to provide a thorough understanding of the embodiments. It will be apparent, however, to one skilled in the art that some embodiments may be practiced without some or all these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method for building an anomaly detection neural network model using an unsupervised training framework including an inlier neural network model and a causality-based label-noise neural network model mutually coupled to a respective output of each other, the method comprising:

receiving, via a communication interface, a dataset of images without any label indicating whether any image is an anomaly;

generating, via the inlier neural network model implemented on one or more processors, a set of noisy labels associated with a subset of the dataset of images that are estimated to be anomalies based on a contamination parameter indicative of a percentage of the images in the dataset being anomalies;

identifying, by the inlier neural network model, a set of high-confidence images that are determined to be either inlier samples or outlier samples with a higher-than-threshold confidence from an input of the dataset of images;

training the causality-based label-noise neural network model, implemented on the one or more processors using a combination of at least a first loss based at least in part on the set of noisy labels and at least a second loss based at least in part on the set of high-confidence images;

generating, via the trained causality-based label-noise neural network model implemented on the one or more processors, a distribution of an estimated proportion of the anomalies in the dataset of images from an input of the dataset of images;

refining the contamination parameter based on the estimated proportion;

training the inlier neural network model based on the estimated inlier samples in the dataset of images determined from the estimated proportion of the anomalies, wherein the estimated inlier samples in the dataset of images is determined based on the estimated proportion of the anomalies;

iteratively retraining the trained inlier neural network model and the trained causality-based label-noise neural network model based on outputs from each other until a first output of the retrained inlier neural network model and a second output of the trained causality-based label-noise neural network model are within a convergence threshold;

building the anomaly detection neural network model from the iteratively retrained causality-based label-noise neural network model by extracting an encoder of the iteratively retrained causality-based label-noise neural network model; and detecting, using the built anomaly detection neural network model comprising the extracted encoder from the training and the retraining, an anomaly in a testing dataset of images.

2. The method of claim 1, wherein the building the anomaly detection neural network model from the iteratively trained causality-based label noise neural network model comprises:

extracting the encoder from the iteratively retrained causality-based label-noise neural network model after the output of the inlier neural network model and the causality-based label-noise neural network model coverages; and interfacing, via the communication interface, the input/output of the encoder.

3. The method of claim 1, wherein the method further comprises:

determining a regularization loss based on the set of high-confidence images and a set of clean labels determined via the causality-based label-noise neural network model;

determining a cross-entropy loss based on the set of noisy labels generated via the inlier neural network model and a reconstructed set of noisy labels generated based on reconstructed input dataset of images via the causality-based label-noise neural network model; and retraining the causality-based anomaly-detection neural network model based on minimizing the regularization loss and the cross-entropy loss.

4. The method of claim 3, further comprising:

determining a reconstruction loss based on the reconstructed dataset of images and the dataset of images; and retraining the causality-based anomaly-detection neural network model based on minimizing the reconstruction loss.

5. The method of claim 1, wherein the determining the set of high-confidence images comprises:

determining a set of inlier images that are a percentile threshold away from a boundary layer between outliers and inliers, wherein the boundary layer is determined based on the set of noisy labels;

determining a set of outlier images that are a percentile threshold away from a boundary layer between outliers and inliers, wherein the boundary layer is determined based on the set of noisy labels; and determining the set of high-confidence images based on the set of inlier instances and the set of outlier images.

6. The method of claim 1, further comprising:

receiving, via the communication interface, an initial probability of anomalies; and initializing the inlier neural network model with the dataset of images.

7. The method of claim 1, further comprising:

reconstructing a reconstructed dataset of images based on the noisy label from the inlier neural network model;

determining an inlier reconstruction loss based on the estimated proportion of anomalies in the dataset; and retraining the inlier neural network model based on the inlier reconstruction loss.

8. The method of claim 1, wherein determining the set of noisy labels that correspond to anomalies in the dataset of images comprises:

determining whether an image in the dataset of images is an inlier based on a boundary layer of anomalies in the inlier neural network model, wherein the boundary layer of anomalies in the inlier neural network model is trained based on a probability of anomalies;

determining a label associated with the image in the dataset of images based on the probability of anomalies; and determining a set of noisy labels that correspond to anomalies in the dataset of images.

9. The method of claim 8, wherein the probability of anomalies is an initial probability of anomalies during the initialization of the inlier neural network model.

10. The method of claim 8, wherein the probability of anomalies is the estimated proportion of anomalies during the retraining of the inlier neural network model.

11. A system for building an anomaly detection neural network model using an unsupervised training framework including an inlier neural network model and a causality-based label-noise neural network model mutually coupled to a respective output of each other, the system comprising:

a communication interface for receiving a dataset of images without a label indicating whether any image is an anomaly;

a memory storing a plurality of machine-readable instructions; and a processor reading and executing the instructions from the memory to perform operations comprising:

receive, via the communication interface, the dataset of images;

generate, via the inlier neural network model implemented on one or more processors, a set of noisy labels associated with a subset of the dataset of images that are estimated to be anomalies based on a contamination parameter indicative of a percentage of the images in the dataset being anomalies;

identify, by the inlier neural network model, a set of high-confidence images that are determined to be either inlier samples or outlier samples with a higher-than-threshold confidence from an input of the dataset of images;

train the causality-based label-noise neural network model, implemented on one or more processors using a combination of at least a first loss based at least in part on the set of noisy labels and at least a second loss based at least in part on the set of high-confidence images;

generate, via the trained causality-based label-noise neural network model implemented on the one or more processors, a distribution of an estimated proportion of the anomalies in the dataset of images from an input of the dataset of images;

refine the contamination parameter based on the estimated proportion;

train the inlier neural network model based on the estimated inlier samples in the dataset of images determined from the estimated proportion of the anomalies, wherein the estimated inlier samples in the dataset of images is determined based on the estimated proportion of the anomalies;

iteratively retrain the trained inlier neural network model and the trained causality-based label-noise neural network model based on outputs from each other until a first output of the retrained inlier neural network model and a second output of the trained causality-based label-noise neural network model are within a convergence threshold;

build the anomaly detection neural network model from the iteratively trained causality-based label-noise neural network model by extracting an encoder of the iteratively retrained causality-based label-noise neural network model; and detect, using the built anomaly detection neural network model comprising the extracted encoder from the training and the retraining, an anomaly in a testing dataset of images.

12. The system of claim 11, wherein the processor further performs operations comprising:

extract the encoder from the iteratively retrained causality-based label-noise neural network model after the output of the inlier neural network model and the causality-based label-noise neural network model coverages; and interface, via the communication interface, the input/output of the encoder.

13. The system of claim 11, wherein the processor further performs operations comprising:

determine a regularization loss based on the set of high-confidence images and a set of clean labels determined via the causality-based label-noise neural network model;

determine a cross-entropy loss based on the set of noisy labels generated via the inlier neural network model and a reconstructed set of noisy labels generated based on reconstructed input dataset of images via the causality-based label-noise neural network model; and retrain the causality-based anomaly-detection neural network model based on minimizing the regularization loss and the cross-entropy loss.

14. The system of claim 11, wherein the processor further performs operations comprising:

determine a reconstruction loss based on the reconstructed dataset of images and the dataset of images; and retrain the causality-based anomaly-detection neural network model based on minimizing the reconstruction loss.

15. The system of claim 11, wherein the processor further performs operations comprising:

determine a set of inlier images that are a percentile threshold away from a boundary layer between outliers and inliers, wherein the boundary layer is determined based on the set of noisy labels;

determine a set of outlier images that are a percentile threshold away from a boundary layer between outliers and inliers, wherein the boundary layer is determined based on the set of noisy labels; and determine the set of high-confidence images based on the set of inlier images and the set of outlier images.

16. The system of claim 15, wherein the processor further performs operations comprising:

receive, via the communication interface, an initial probability of anomalies; and initialize the inlier neural network model with the dataset of images.

17. The system of claim 11, wherein the processor further performs operations comprising:

reconstruct a reconstructed dataset of images based on the noisy label from the inlier neural network model;

determine an inlier reconstruction loss based on the estimated proportion of anomalies in the dataset; and retrain the inlier neural network model based on the inlier reconstruction loss.

18. The system of claim 17, wherein the processor further performs operations comprising:

determining whether an image in the dataset of images is an inlier based on a boundary layer of anomalies in the inlier neural network model, wherein the boundary layer of anomalies in the inlier neural network model is trained based on a probability of anomalies;

determining a label associated with the image in the dataset of images based on the probability of anomalies; and determining a set of noisy labels that correspond to anomalies in the dataset of images.

19. A processor-readable non-transitory storage medium storing a plurality of processor-executable instructions for building an anomaly detection neural network model using an unsupervised training framework including an inlier neural network model and a causality-based label-noise neural network model mutually coupled to a respective output of each other, the instructions being executed by one or more processors to perform operations comprising:

receiving a dataset without a label indicating whether any image in the dataset is an anomaly;

generating, via the inlier neural network model implemented on one or more processors, a set of noisy labels associated with a subset of the dataset based on a contamination parameter indicative of a percentage of the images in the dataset being anomalies;

identifying, via the inlier neural network model implemented on the one or more processors, a set of high-confidence images that are determined to be either inlier samples or outlier samples with a higher-than-threshold confidence from an input of the dataset;

training the anomaly detection neural network model implemented on the one or more processors, using a combination of at least a first loss based on the set of noisy labels that identifies an intermediate clean label set and at least a second loss based on the set of high-confidence images;

generating, via the trained anomaly detection neural network model, an intermediate probability of anomalies in the dataset;

refining the contamination parameter based on the estimated proportion;

iteratively retraining the inlier neural network model and the trained anomaly detection neural network model based on the outputs from each other until a first output of the inlier neural network model and are within a convergence threshold;

determining a refined contamination parameter associated with the anomaly detection neural network model based on the proportion of anomalies in the anomaly detection neural network model at convergence; and detecting, using the built anomaly detection neural network model, an anomaly in a testing dataset of images.

20. The processor-readable non-transitory storage medium of claim 19 storing a plurality of processor-executable instructions for unsupervised anomaly detection, the instructions being executed by one or more processors to perform operations further comprising:

determining, via an autoencoder, a reconstructed inlier data set based on the intermediate clean label;

determining, a reconstruction loss based on the reconstructed inlier data set and the data set; and updating the autoencoder based on the reconstruction loss.

* * * * *